United States Patent [19]

Zaar et al.

[11] 4,361,686
[45] Nov. 30, 1982

[54] PREPARATION OF COPOLYMERS OF ETHYLENE WITH AT LEAST ONE OTHER 1-MONOOLEFIN AND AN OPTIONAL UNCONJUGATED DIENE

[75] Inventors: Wolfgang Zaar; Manfred Schröeder; Gunther Maahs, all of Marl, Fed. Rep. of Germany

[73] Assignee: Chemische Werke Huels, Aktiengesellschaft, Marl, Fed. Rep. of Germany

[21] Appl. No.: 180,204

[22] Filed: Aug. 21, 1980

[30] Foreign Application Priority Data

Aug. 22, 1979 [DE] Fed. Rep. of Germany ....... 2933885

[51] Int. Cl.³ .................... C08F 4/68; C08F 210/18
[52] U.S. Cl. ............................ 526/143; 252/429 B; 526/282
[58] Field of Search ........................... 526/143

[56] References Cited

U.S. PATENT DOCUMENTS 3,629,212 12/1971 Benediktes et al. ............. 526/143
4,181,790 1/1980 Maahs et al. .................... 526/143

Primary Examiner—Edward J. Smith
Attorney, Agent, or Firm—Millen & White

[57] ABSTRACT

A process for preparing a copolymer by copolymerizing ethylene and at least one other 1-monoolefin and, optionally, and unconjugated diene in the presence of a mixed catalyst of (1) a compound of a metal of main Groups I–III of the periodic table having at least one hydrogen atom or an alkyl or aryl group bound to the metal atom, and (2) a compound of a metal of Subgroups IV–VI of the periodic table, comprises performing the copolymerization in the presence of an amount effective as an activator of a 2, 3,4,4-tetrachloro-2-butenoic acid ester of the fromula

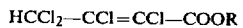

HCCl$_2$—CCl=CCl—COOR wherein R is an optionally halogenated alkyl, cycloalkyl, aryl, alkaryl or aralkyl group, and wherein the cycloalkyl, aryl, alkaryl or aralkyl groups are optionally substituted by one or more alkyl groups.

6 Claims, No Drawings

4,361,686

PREPARATION OF COPOLYMERS OF ETHYLENE WITH AT LEAST ONE OTHER 1-MONOOLEFIN AND AN OPTIONAL UNCONJUGATED DIENE

BACKGROUND OF THE INVENTION

The production of copolymers of 1-olefins is generally accomplished using the so-called Ziegler-Natta catalysts, among which combinations (mixed catalysts) of vanadium compounds and alkyl aluminum halides are best suitable. These compounds are soluble in the inert solvents in which polymerization is effected. One disadvantage is that the catalysts must be used in a relatively high concentration, since the amount of polymer formed per catalyst unit is not large. When attempting to overcome this drawback by an increased charge of monomers and/or by higher pressure, the catalyst activity is raised somewhat, but the molecular weight of the thus-formed polymers becomes so high that they can be processed only with difficulty. In addition, the relatively high molecular weight results in a high viscosity of the solution of polymers, so that heat removal during polymerization is made difficult; accordingly, polymerization in large reaction vessels becomes uneconomical.

It is also known that the yield of polymer can be increased by the addition of halogenated organic compounds, varyingly called promoters, reactivators or activators. Thus, in French Pat. No. 1,417,195, trihaloacetic acids, especially the esters thereof, hexachloropropylene, and hexachloroacetone are disclosed as promoters. Analogous use of hexachlorocyclopentadiene is known from French Pat. No. 1,370,358.

Such additives, however, are disadvantageous in that they inhibit the mixed catalysts when used in the concentrations which are necessary for the additives to be effective to an adequate extent.

These disadvantages have been diminished by the use of perchlorobutenoic acid compounds (German Pat. No. 1,595,442), prepared according to A. Roedig and P. Bernemann (Liebigs Ann. Chem. 600 : 1 [1956]). In this connection, it had previously been impossible to analytically determine whether compounds of perchlorocrotonic acid or of the isomeric perchlorovinylacetic acid were involved. Only in recent times has it been possible to unequivocally determine the structure as that of perchlorovinylacetic acid.

However, there has still remained a need for an improved process for producing copolymers of ethylene with at least one other 1-monoolefin and, optionally, an unconjugated diene.

SUMMARY OF THE INVENTION

Accordingly, it is an object of the present invention to provide such an improved process, e.g., wherein the reaction velocity is increased, the content of foreign materials and the gel content are reduced in the polymer, and the economy of the process is raised by providing an activator which is less expensive than the commercially available activators.

Upon further study of the specification and appended claims, further objects and advantages of this invention will become apparent to those skilled in the art. These objects have been attained by providing a process for preparing copolymers of ethylene and at least one other 1-monoolefin and, optionally, an unconjugated diene, in the presence of mixed catalysts of compounds of metals from Main Groups I-III of the Periodic Table of the Elements containing at least one hydrogen atom or an alkyl or aryl group bound to the metal atom, and of compounds of metals of Subgroups IV-VI of the Periodic Table, as well as in the presence of organic chlorine compounds as activators, comprising, using as the activators 2,3,4,4-tetrachloro-2-butenoic acid esters of the formula

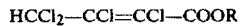

$$HCCl_2—CCl=CCl—COOR$$

wherein R is an optionally halogenated alkyl, cycloalkyl, aryl, alkaryl or aralkyl residue, and wherein the cycloalkyl, aryl, alkaryl and aralkyl residues are optionally substituted on the cyclic portions by one or more straight-chain or branched aliphatic residues.

DETAILED DESCRIPTION

Suitable 1-monoolefins, which can be copolymerized with ethylene in the claimed process individually or in a mixture, include all straight-chain and branched 1-alkenes of 3-16 carbon atoms. Typical representatives include propene, butene-1, 1-pentene, 1-hexene, 1-octene, 1-nonene, 1-decene, and 4-methyl-1-pentene. The preferred 1-monoolefin is propylene.

Unconjugated dienes, cyclic and acyclic, suitable for copolymerization with ethylene and the aforementioned 1-monoolefins generally contain 4–20 C atoms. These include, for example, cis- and trans-1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, exo- and endo-dicyclopentadiene, exo- and endo-alkenylnorbornenes, such as 5-propenyl-, 5-(buten-2-yl)-, and 5-(2-methylbuten-[2']-yl)norbornene, alkylalkenylnorbornenes, such as, for example, 5-methyl-6-propenylnorbornene, alkylidenenorbornenes, such as 5-methylene-, 5-ethylidene-, and 5-isopropylidene-2-norbornene, vinylnorbornene, cyclohexenylnorbornene, alkylnorbornadienes, such as methyl-, ethyl-, and propylnorbornadiene, or cyclodienes, such as 1,5-cyclooctadiene, wherein 5-ethylidene-2-norbornene, cis- and trans-1,4-hexadiene, and dicyclopentadiene (exo- and/or endo-) are preferred.

The aforementioned unsaturated monomers (ethylene, 1-monoolefins, and unconjugated dienes) can each be utilized within wide ranges of suitable amounts depending on the properties of the finally desired copolymer, as is conventional. In general, however, the process of this invention is used to produce primarily amorphous and high-molecular weight saturated copolymers consisting of 15–90% by weight, preferably 30–75% by weight of ethylene and 85–10% by weight, preferably 70–25% by weight of at least one 1-monoolefin; as well as amorphous and high molecular weight unsaturated copolymers consisting of, in addition to the foregoing amount of ethylene and 1-monoolefin(s), one or several unconjugated diene(s), in such an amount that there are 0.5–30 double bonds per 1,000 carbon atoms in the unsaturated copolymers.

Suitable examples of compounds of metals of Main Groups I through III of the periodic table (Hollemann-Wiberg, "Lehrbuch der anorganischen Chemie" [Textbook of Inorganic Chemistry] [1956], periodic table of the elements), which contain at least one hydrogen atom or an alkyl group or an aryl group bound to the metal atom include amylsodium, butyllithium, diethylzinc, etc., but particularly aluminum compounds, such as, for example, trialkyl, triaryl, and triaralkyl aluminum compounds, such as trimethylaluminum, triethylaluminum, triisobutylaluminum, triphenylaluminum, tri(ethylphenyl)aluminum, as well as mixtures of these compounds. Furthermore, also suitable are alkyl aluminum halides of the formula $AlR'_nX_{3-n}$ wherein X is chlorine or bromine, R' is alkyl of up to 6 carbon atoms and n is a number from 1 to 2, for example diethylaluminum monochloride, diethylaluminum monobromide, ethylaluminum dichloride, and ethylaluminum dibromide, as well as, with special advantage, the equimolar mixtures, called alkyl aluminum sesquichlorides, of a dialkylaluminum monochloride and an alkylaluminum dichloride. Ethyl aluminum sesquichloride $[(C_2H_5)_3Al_2Cl_3]$ is preferably used in the process of this invention.

Suitable compounds of the metals of Subgroups IV through VI of the periodic table include titanium tetrachloride and chlorotitanic acid esters, such as diethyl dichlorotitanate $[Ti(OC_2H_5)_2Cl_2]$; chromium trioxide by itself or in a mixture with titanium compounds; chromium ester, such as chromium (III) 2-ethylhexanoate; organotin chromates, such as bis (triphenyltin)-chromate; but especially vanadium compounds, preferably vanadium compounds soluble in organic solvents, e.g., vanadium trichloride, vanadium tetrachloride, and vanadium oxychloride; furthermore, vanadium esters, such as vanadium triacetate $[V(OOC.CH_3)_3]$ and vanadium triacetylacetonate $[V(C_5H_7O_2)_3]$, but primarily vanadium oxychloride.

The mixed catalyst contains the metals of Main Groups I through III, on the one hand, and of Subgroups IV through VI, on the other hand, generally in a molar ratio of 60:1 to 5:1, preferably 45:1 to 10:1. The ratio of the metal of Subgroups IV to VI to the monomers utilized is 0.0001 to 0.03 gram-atom per mole of monomer, preferably 0.001–0.005 gram-atom per mole of monomer.

The 2,3,4,4-tetrachlor-2-butenoic acid esters of the formula $HCCl_2—CCl=CCl—COOR$ which are predominantly suitable are those wherein R is a straight-chain or branched aliphatic residue, e.g., alkyl of 1–15 carbon atoms or a cycloaliphatic e.g., cycloalkyl residue of 3–12 carbon atoms or a hydrocarbon aromatic residue of 6–14 carbon atoms. The aralkyl and alkaryl groups may contain 1–15 C atoms in the alkyl portion and 6–14 C atoms in the aryl portion and a total of 7–29 C atoms. The saturated and unsaturated cyclic residues, i.e., cycloalkyl, aryl, alkaryl and aralkyl groups can optionally be substituted by one or more aliphatic, e.g., alkyl, straight-chain or branched residues of 1–15 C atoms. Furthermore, the residue R can be partially halogenated or perhalogenated, by F, I or Br and, preferably, chlorinated.

Suitable esters of 2,3,4,4-tetrachloro-2-butenoic acid include, for example, the methyl, ethyl, propyl, isopropyl, n-butyl, sec-butyl, isobutyl, tert-butyl, n-pentyl, n-hexyl, n-heptyl, 2-methylhexyl, 2-ethylhexyl, n-octyl, n-nonyl, n-decyl, n-dodecyl, cyclopropyl, cyclopentyl, cyclohexyl, cyclooctyl, cyclodecyl, cylododecyl, phenyl, o-, m-, and p-cresyl, α- and β-naphthyl, 2,3,3,3-tetrachloropropyl, 2,4,4,4-tetrachlorobutyl, 3,5,5,5-tetrachloropentyl, mono-, di, tri-,tetra-, and pentachloro- or -bromophenyl, e.g. 2-chlorophenyl, 3-chlorophenyl, 4-chlorophenyl, 2,3-dichlorophenyl, 2,4-dichlorophenyl, 2,5-dichlorophenyl, 2,6-dichlorophenyl, 2,4,6-trichlorophenyl, 2,3,4,6-tetrachlorophenyl, and pentachlorophenyl esters. Especially preferred are the methyl ester and the n-butyl ester.

The 2,3,4,4-tetrachloro-2-butenoic acid esters are used in concentrations of 5–250 millimoles, preferably 50–100 millimoles per 1 millimole of the compound of a metal of Subgroups IV–VI of the periodic table, i.e., preferably of the vanadium compound.

Because of the addition of the 2,3,4,4-tetrachloro-2-butenoic acid esters, the polymerization-active valence stage of the metals of Subgroups IV to VI is preserved for a longer period of time, so that the catalyst performance is optimized. 2,3,4,4-Tetrachloro-2-butenoic acid esters can also be employed in admixture with other activators, e.g. 2,3,4,4-tetrachloro-3-butenoic acid ester, perchlorovinylacetic acid ester, hexachloroacetone, hexachlorocyclo-1,3-pentadiene, hexachloro-1,3-butadiene, and trichloroacetic acid ester, since their effectiveness and/or the efficacy of the mixed catalyst, is not impaired thereby.

The 2,3,4,4-tetrachloro-2-butenoic acid esters used in this invention as set forth in the examples can be produced in good yields starting with perchlorocyclobutenone. Via a ring opening reaction, the cyclic ketone is hydrolyzed with aqueous sodium carbonate solution to 2,3,4,4-tetrachloro-2-butenoic acid. In accordance with G. Maahs, Liebigs Ann. Chem. 686; 55–63 (1965), 3,4,4,4-tetrachloro-2-butenoic acid is produced in this reaction. The structure of this compound was not certain based on earlier knowledge and identification methods; however, according to more recent investigations by means of $^{13}C$-NMR spectroscopy, 2,3,4,4-tetrachloro-2-butenoic acid has been unequivocally ascertained as the correct structure.

The reaction of this acid with thionyl chloride produced the corresponding acid chloride in high yields, from which the respective esters can readily be produced by conventional reaction with the corresponding alcohol.

These reactions are fully conventional as disclosed, e.g., in Houben Weyl, Methoden der Organischen Chemie, Band VIII (1952), Seiten 467 und 543 whose disclosures are incorporated by reference herein.

Unless otherwise specified herein, the process of this invention is conducted by fully conventional methods, e.g., as disclosed in the U.S. Pat. No. 3,622,548 whose disclosure is incorporated by reference herein.

The copolymerization can be carried out in the liquefied monomers under pressure; however, advantageously the process is conducted in the presence of inert solvents, e.g., in hydrocarbons or hydrocarbon mixtures which are liquid under the reaction conditions, such as butane, pentane, hexane, cyclohexane, isopropylcyclohexane; gasoline fractions, such as petroleum ether; furthermore, benzene, toluene, and xylene; or also chlorinated hydrocarbons, such as tetrachloroethylene or chlorobenzene: and mixtures thereof. Hexane has proved to be especially well suitable.

It is essential that the solvents used be maximally free from water and other H-acidic compounds, as well as from compounds having donor functions (i.e., Lewis bases), e.g., by a suitable purification. Except for small amounts which are optionally added to attain certain effects, as is conventional, such impurities generally impair the activity of the catalyst. One such positive addition is that of a Lewis base which may be employed in an amount up to 20- fold the amount of the activator. These produce a positive effect in the process of this invention and include, for example, ammonia, aniline, pyridine, quinoline, triethylamine, cyclohexylamine, etc.

The reaction takes place especially smoothly if mixed catalysts are employed which are soluble or colloidally distributed in the solvents utilized.

The polymerization is generally conducted at temperatures of 0° to +80° C., preferably +10° to +70° C. The reaction is conducted at an adequate velocity without the use of pressure, but it can also be effected under pressure. The polymerization, preferably carried out in a continuous mode, is conventionally short-stopped by the addition of hydrogen-active compounds, such as water, alcohols or carboxylic acids.

The copolymers produced according to the process of this invention can be worked up in various conventional ways. A polymeric liquid, for example, after inactivation of the catalyst, can be freed from solvents and other volatile components, such as residual monomer and possibly lower oligomers, simply by distillation, for example on a forced-circulation or thin-film evaporator. The solution of an elastomer is more advantageously worked up suitably by precipitation, e.g. with a lower alcohol, such as methanol, ethanol, or isopropanol, or by removing the solvent with steam.

The copolymers produced according to the process of this invention, generally exhibiting a reduced specific viscosity (RSV value) of 0.5–5 dl/g, preferably 1–3 dl/g, are suitable in vulcanized or unvulcanized condition for many technical and industrial purposes, for example for the manufacture of water hoses, cylinder liners, foam-rubber gaskets, bumper pads, sheets, films, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples all temperatures are set forth uncorrected in degrees Celsius; unless otherwise indicated, all parts and percentages are by weight.

The characteristic data mentioned therein (RSV value, insoluble proportion in toluene at 90° C. and number of double bonds per 1,000 carbon atoms) were determined as follows:

(1) RSV value in 0.1% strength solution in p-xylene at 90° C.;

(2) Insoluble proportion in toluene at 90° C., which is an orienting parameter for the degree of crystallinity, by heating the specimen to 90° C., the entire copolymer thus being dissolved. After cooling to 20° C., the indicated portion is then precipitated (percent by weight based on the weight of the specimen).

(3) Proportion of double bonds per 1,000 carbon atoms by infrared spectroscopy.

EXAMPLE 1

I. Preparation of 2,3,4,4-Tetrachloro-2-butenoic Acid n-Butyl Ester (a) 2,3,4,4-Tetrachloro-2-Butenoic Acid Chloride An agitated flask is charged with 800 g (6.72 mole) of thionyl chloride together with 2 ml of dimethylformamide as accelerator; the mixture is heated under agitation to 50° C. and, within 2 hours, 350 g (1.56 mol) of crystalline 2,3,4,4-tetrachloro-2-butenoic acid is added in incremental portions. During this step a strong evolution of gas occurs. After the addition has been completed, the mixture is heated for 1–2 hours to boiling (79° C.) until the evolution of sulfur dioxide and hydrogen chloride has ceased (bubble counter at the cooler outlet). Thereafter the reaction mixture is distilled over a 10 cm column, thus obtaining 604 g (5.07 mol) of unreacted thionyl chloride and 359 g (1.48 mol) of 2,3,4,4-tetrachloro-2-butenoic acid chloride; b.p. 102° C./26 mbar; $n_D^{20}=1.5478$. Yield: 95% of theory.

(b) 2,3,4,4-Tetrachloro-2-butenoic Acid n-Butyl Ester

An agitated flask is charged with 0.5 mole of n-butanol and heated under stirring to 50° C. Within 30 minutes, 60.6 g (0.25 mol) of 2,3,4,4-tetrachloro-2-butenoic acid chloride is added dropwise to the charge, and the latter is agitated for 30 minutes at 80° C. During this step the main quantity of the thus-formed hydrogen chloride is driven off in the gaseous phase. Subsequently, the reaction mixture is fractionated without neutralization over a 10 cm column under vacuum, thus obtaining 64.4 g (0.23 mol) of 2,3,4,4-tetrachloro-2-butenoic acid n-butyl ester; b.p. 95° C./0.6 mbar; $n_D^{20}$—1.5050. Yield: 92% of theory.

II. Preparation of a Copolymer of Ethylene, Propylene, and 5-Ethylidene-2-norbornene (a) Apparatus The copolymer is produced in a glass reactor having a capacity of 2 l, charged with 1.5 l of dry hexane. The glass reactor is equipped with an agitator and carries three graduated dropping funnels.

Dropping funnel 1 contains 1.5 mmol of VOCl$_3$ in 1 l of hexane, which is added dropwise at a rate of 0.375 mmol per hour during a period of 4 hours. The average concentration in the reactor, based on 7 l of solvent, is 0.214 mmol of VOCl$_3$ per liter.

Dropping funnel 2 contains 42 mmol of ethyl aluminum sesquichloride in 1.5 l of hexane, which is added dropwise at 10.5 mmol per hour, i.e., again based on the total charge, 6.0 mmol per liter.

Dropping funnel 3 contains 4.4 mmol of 2,3,4,4-tetrachloro-2-butenoic acid n-butyl ester as well as 50 mmol of ethylidene norbornene in 2.5 l of hexane. At a dropwise addition rate of 1.1–12.5 mmol per hour, the average concentration in the reactor is 0.629 mmol or 7.143 mmol per liter.

(b) Polymerization

The hexane is saturated at room temperature under agitation with ethylene/propylene in a molar ratio of 1:1.5. Thereafter, the mixture is heated to 30°–35° C., and this temperature is maintained for a reaction period of 4 hours by means of a thermostated bath. During this time the solutions of the individual catalyst components and of the tercomponent are added dropwise, and ethylene/propylene is introduced at 1:1.5 mole per hour.

(c) Working-Up Process

The polymer solution is discharged continuously at about 1.3 l per hour into a second agitated vessel containing 5 g of a commercially available stabilizer (octadecyl ω-2,4-ditert-butyl- 3-hydroxyphenylpropionate). By the addition of 350 ml of isopropanol, short-stopping is effected. Thereafter, the polymer solution is freed of hexane with steam in an apparatus conventionally used for this purpose. The copolymer then contains about 50% by weight of water which is removed in a vacuum drying chamber at 50° C.; the yield is 261 g.

(d) Analytical Data, see Table 1.

EXAMPLES 2-10 and COMPARATIVE EXAMPLES A-C

The examples and comparative examples were conducted in the apparatus described in Example 1. The conductance of the polymerization and the working up of the polymers were likewise accomplished under the conditions of Example 1. The activators, the catalyst concentration and/or the ratio of ethylene to propene of the feed gas were altered. The individual catalyst components are denoted as follows in the table:

a = $VOCl_3$
b = $(C_2H_5)_3Al_2Cl_3$
c = $CHCl_2-CCl=CCl-COOR$
$c_1$ = R = $-CH_3$
$c_2$ = R = $-C_2H_5$
$c_3$ = R = $-n-C_4H_9$
$c_4$ = R = $-CH_2CH_2Cl$
$c_5$ = R = $-CH_2CH_2CH_2Cl$

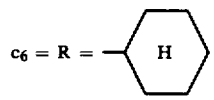

$c_6$ = R =

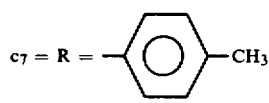

$c_7$ = R =    $-CH_3$

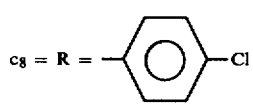

$c_8$ = R =    $-Cl$

d = $CCl_2=CCl-CCl_2-COO-n-C_4H_9$

The analytical data are likewise set forth in Table 1.

TABLE 1

| Example | 1 | A | 2 | B | 3 | C |
|---|---|---|---|---|---|---|
| Component [mmol/l] | | | | | | |
| a | 0.214 | 0.214 | 0.214 | 0.214 | 0.25 | 0.25 |
| b | 6.0 | 6.0 | 6.0 | 6.0 | 3.0 | 3.0 |
| $c_3$ | 0.629 | — | 0.629 | — | 0.629 | — |
| d | — | 0.629 | — | 0.629 | — | 0.629 |
| Ethylene/Propene [mol/h] | 1:1.5 | 1:1.5 | 1.3:1.3 | 1.3:1.3 | 1.7:0.8 | 1.7:0.8 |
| Yield [g] | 261 | 234 | 275 | 258 | 304 | 255 |
| (%) | (77) | (67) | (76) | (71) | (93) | (79) |
| Analysis | | | | | | |
| ML 1 + 4 (100° C.) | 115 | 60 | 165 | 125 | 150 | 146 |
| DIN 53 523 Insoluble Proportion in Toluene | | | | | | |
| at 20° C. [%] | <2 | <2 | <2 | 5 | 10 | 25 |
| at 90° C. | <2 | <2 | <2 | <2 | 7 | 12 |
| Propene Content [%] | 55 | 56 | 50 | 47 | 40 | 35 |
| Double Bonds per 1,000 C Atoms | 5.6 | 5.6 | 5.6 | 5.6 | 5.5 | 5.6 |
| RSV Value [dl/g] | 2.65 | 2.60 | 2.43 | 2.50 | 2.52 | 2.60 |

TABLE 1-continued

| Example | 4 | 5 | 6 | 7 | 8 | 9 | 10 |
|---|---|---|---|---|---|---|---|
| Component [mmol/l] | | | | | | | |
| a | 0.25 | 0.25 | 0.25 | 0.25 | 0.25 | 0.25 | 0.25 |
| b | 3.0 | 3.0 | 3.0 | 3.0 | 3.0 | 3.0 | 3.0 |
| $c_1$ | 0.629 | — | — | — | — | — | — |
| $c_2$ | — | 0.629 | — | — | — | — | — |
| $c_4$ | — | — | 0.629 | — | — | — | — |
| $c_5$ | — | — | — | 0.629 | — | — | — |
| $c_6$ | — | — | — | — | 0.629 | — | — |
| $c_7$ | — | — | — | — | — | 0.629 | — |
| $c_8$ | — | — | — | — | — | — | 0.629 |
| Ethylene/Propene [mol/h] | 1.7:0.8 | 1.7:0.8 | 1.7:0.8 | 1.7:0.8 | 1.7:0.8 | 1.7:0.8 | 1.7:0.8 |
| Yield [g] | 250 | 260 | 275 | 265 | 225 | 230 | 240 |
| (%) | (77) | (80) | (85) | (82) | (69) | (71) | (74) |
| Analysis | | | | | | | |
| ML 1 + 4 (100° C.) | 145 | 142 | 135 | 144 | 160 | 153 | 150 |
| DIN 53 523 Insoluble Proportion in Toluene | | | | | | | |
| at 20° C. [%] | 6 | 10 | 32 | 36 | 20 | 30 | 28 |
| at 90° C. | 4 | 6 | 8 | 5 | 7 | 14 | 14 |
| Propene Content [%] | 36 | 35 | 37 | 38 | 31 | 35 | 34 |
| Double Bonds per 1,000 C Atoms | 5.8 | 6.2 | 5.7 | 5.6 | 5.8 | 5.8 | 6.3 |
| RSV Value [dl/g] | 2.22 | 2.40 | 2.65 | 2.46 | 2.82 | 2.45 | 2.76 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing a copolymer by copolymerizing ethylene and at least one other 1-monoolefin and, optionally, an unconjugated diene in the presence of a mixed catalyst of (1) an alkyl aluminum halide of the formula $AlR'_nX_{3-n}$ wherein X is chlorine or bromine, R' is alkyl of up to 6 carbon atoms, and n is a number from 1 to 2 inclusive, and (2) a vanadium compound soluble in organic solvents employable in the copolymerization, which comprises performing the copolymerization in the presence of an amount effective as an activator of a 2,3,4,4-tetrachloro-2-butenoic acid ester of the formula $HCCl_2-CCl=CCl-COOR$ wherein R is a non-halogenated alkyl group.

2. A process of claim 1, wherein the mixed catalyst is a combination of ethyl aluminum sesquichloride and vanadium oxychloride.

3. The process of claim 1 wherein the activator is the methyl or n-butyl ester.

4. A process of claim 1, wherein the activator is 2,3,4,4-tetrachloro-2-butenoic acid n-butyl ester.

5. The process of claim 1 wherein the amount of activator is 5-250 millimoles per mole of vanadium compound.

6. The process of claim 1 which is conducted in an inert solvent.

* * * * *